Jan. 9, 1945. C. J. E. RYDH 2,367,142
VEHICLE
Filed April 7, 1943 5 Sheets-Sheet 1

INVENTOR
Carl Johan Edwin Rydh
By
his ATTY.

Jan. 9, 1945.  C. J. E. RYDH  2,367,142
VEHICLE
Filed April 7, 1943   5 Sheets-Sheet 3

INVENTOR
Carl Johan Edwin Rydh
his ATTY.

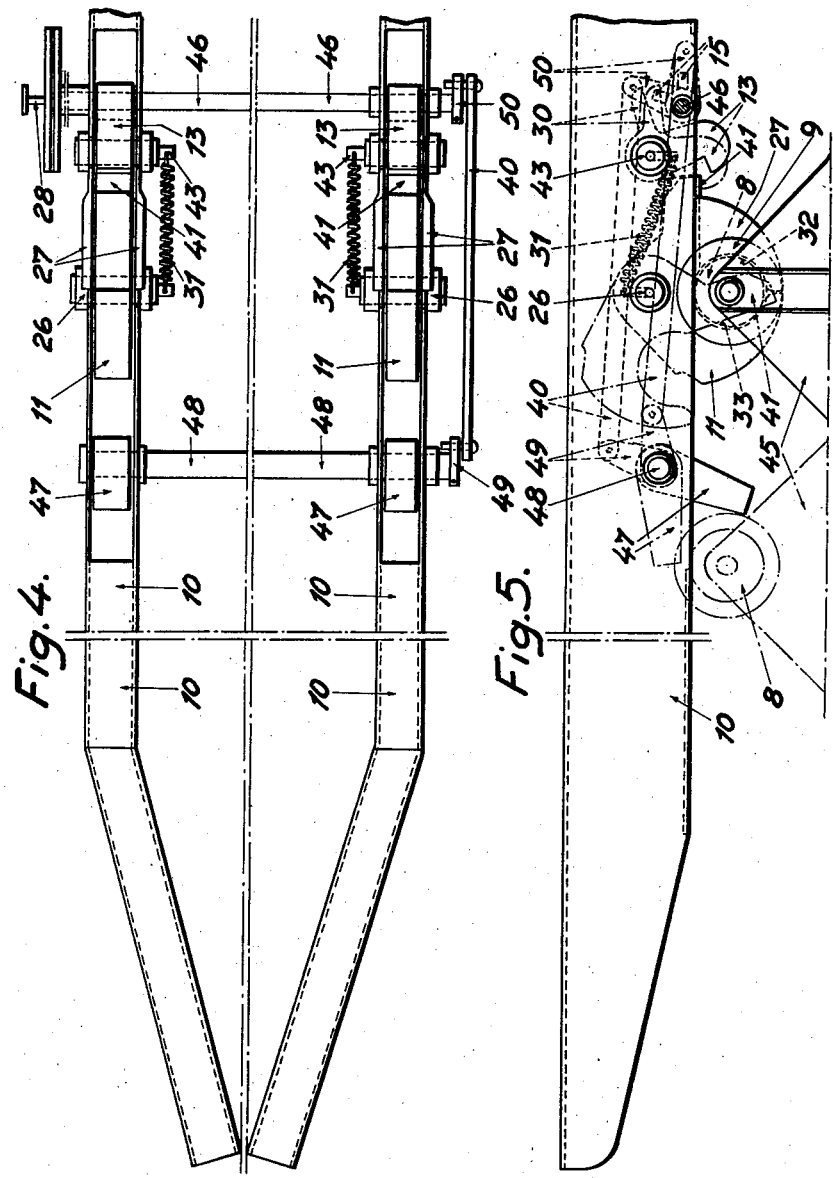

Jan. 9, 1945. C. J. E. RYDH 2,367,142
VEHICLE
Filed April 7, 1943  5 Sheets-Sheet 5

INVENTOR
Carl Johan Edwin Rydh
his ATTY.

Patented Jan. 9, 1945

2,367,142

UNITED STATES PATENT OFFICE 2,367,142

VEHICLE

Carl Johan Edwin Rydh, Virserum, Sweden

Application April 7, 1943, Serial No. 482,125
In Sweden April 17, 1941

4 Claims. (Cl. 280—33.1)

The present invention relates to a device in vehicles with trailer, in order to obtain a reliable, yet easy and comfortable connection between traction vehicle and trailer and an equally easy disconnection of the latter. For this purpose the traction vehicle is provided with a turntable device in which both of the disks are located on the vehicle, and the trailer is provided with a locking mechanism to lock the same on the upper disk of the turntable. On the latter disk there are provided guide rollers which guide the frame of the trailer on to the turntable device so that a connection is obtained between the traction vehicle and the trailer. To ensure an effective lubrication of the wear surfaces between the disks of the turntable the upper disk is provided with perforations, and on the disk there is provided a lubricating felt under a protective plate. Said lubricating felt is preferably once a week soaked with used oil from the motor through an oil filling plug located on the protective plate. The locking mechanism for the trailer consists of swingable hooks which are locked by means of stopping members and pawls which preferably are connected with one another in such a way that they will work simultaneously. There are preferably also bolts for locking and releasing the pawls.

To transmit the brake powers there is preferably used a rod or the like, which runs through a center bolt for the turntable disks, and a brake cylinder actuating the brake system of the trailer, the brake cylinder being adapted to cooperate with the above mentioned rod which in its turn is adapted to be actuated by the brake device of the traction vehicle. If the invention is applied to traction vehicles with hydraulic brake system, a hook or the like should be provided to stop the rod running through the center bolt, said rod being via a lever adapted to be actuated by a piston in a brake cylinder located in the traction vehicle when the trailer is going to be disconnected or is being disconnected. When the brake system of the traction vehicle is actuated it will thus, irrespective of mechanic, hydraulic or similar brake system being used, be possible to transmit said actuation to the brake cylinder on the trailer and thus to the brakes of the trailer.

An embodiment of the invention is illustrated on the accompanying drawings, in which Figs. 1 and 2 are side and plane views respectively of the traction vehicle and the trailer.

Figs. 4 and 5 show a bottom view and a side view respectively of the trailer on a larger scale, the elements of the brake aggregate being omitted.

Figure 1:
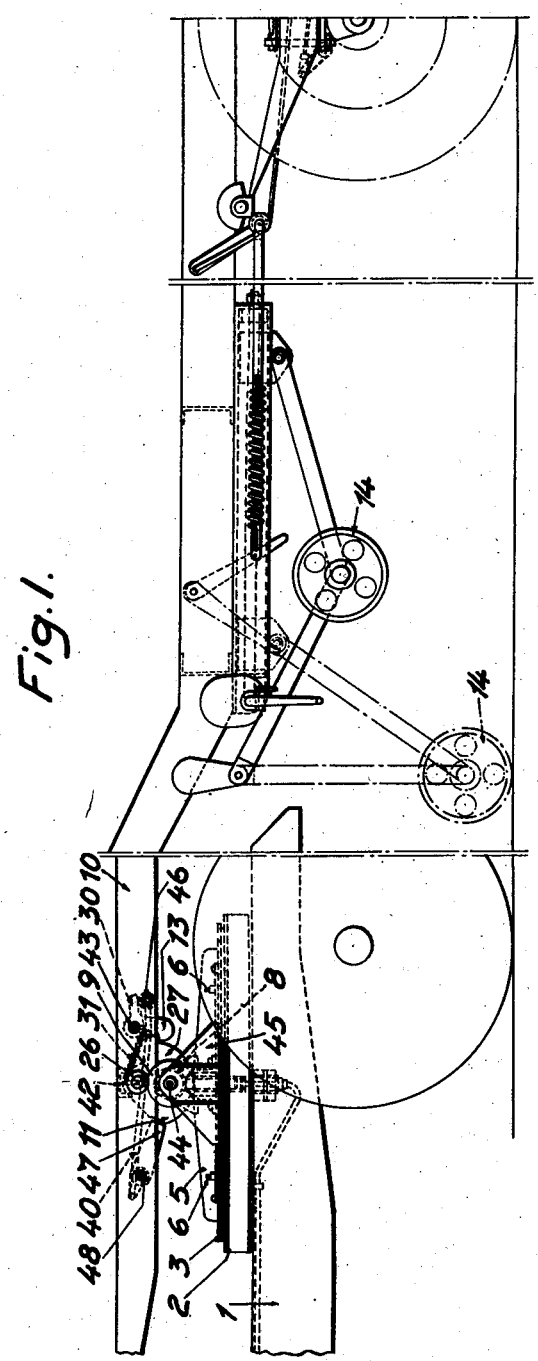

The turntable device of the traction vehicle 1 consists of a lower disk 2 and an upper disk 3, on which the lubricating felt 4 is located under a protective plate 5. In this protective plate there are one or more oil filling plugs 6 through which the oil can be supplied to the lubricating felt 4. The upper disk 3 is provided with perforations through which the oil from the lubricating felt can be brought to the wear surfaces between the disks. On the upper disk, two radially extending axles 44, are mounted in bearing brackets 45, said axles carrying rollers 8 with support flanges 9 between which the frame 10 on the trailer is intended to be inserted when the traction vehicle and the trailer are to be connected to one another.

A circular recess 33 having the same radius as the rollers 8 on the turntable disk is made in hooks 11 which are swingably mounted around pins 26 in the frame of the trailer. Said hooks cooperate with stationary supports 27 on the frame 10, said supports having recesses 32 which together with the recesses 33 of the swingable hooks 11 form circular apertures in which the rollers 8 are intended to lie when the traction vehicle and the trailer have been connected in the way indicated in full lines in Fig. 1 of the drawings. Pawls 13 swingable around pins 43 in the frame 10 shall enter under projections 41 integral with the swingable hooks 11 and retain the latter at their place around the rollers 8. Further bolts 15 adapted to cooperate with the hooks 13 are fixed to a turntable shaft 46 mounted in the frame 10. Bolts 47 serving as stopping members and fixed to a shaft 48 mounted in the frame 10 are adapted to rest against the hooks 11 when the traction vehicle and the trailer have been connected together, Fig. 1. Arms 49, 50 fixed to the shafts 48 and 46 are connected to one another by a rod 40. The bolts 47 and 13 can be operated by a crank 28 fixed to the shaft 46 and adapted to be locked in different positions.

As mentioned above, the pawl 13 and the bolts 15 and 47 assume the positions shown in Fig. 1 when the traction vehicle and the trailer have been connected with one another. At disconnection it is possible by turning the crank 28 to release the pawls 13 from their engagement with the hooks 11 by means of the bolts 15 because said bolts by actuating projections 30 on the pawls 13 will cause that said pawls, against the action of springs 31 fixed between arms secured on the pins 26 and 43, are brought out of their locking positions. By the intermediary of the rod 40 the bolts 47 are simultaneously brought out of engagement with the hooks 11. The positions then assumed by the elements are indicated in full lines in Fig. 5. Naturally, not until the support wheel 14 of the trailer has been caused to assume its position shown in dot and dash lines instead of the position shown in full lines in Fig. 1 the traction vehicle can be removed. When, then, the tractor is moved forward, the rollers 8 will swing the hooks 11 upwardly out of their way, as indicated in dot and dash lines in Fig. 5, and finally also the bolts 47 will be swung away to the indicated positions. The positions which the elements now have been caused to assume are maintained until the traction vehicle and the trailer are to be connected again whereby the rollers 8 by actuating the projections 41 integral with the hooks 11 cause said hooks to engage the rollers 8 again. Then the other elements are returned by the crank 28 to the positions shown in full lines in Fig. 1.

Figure 2:
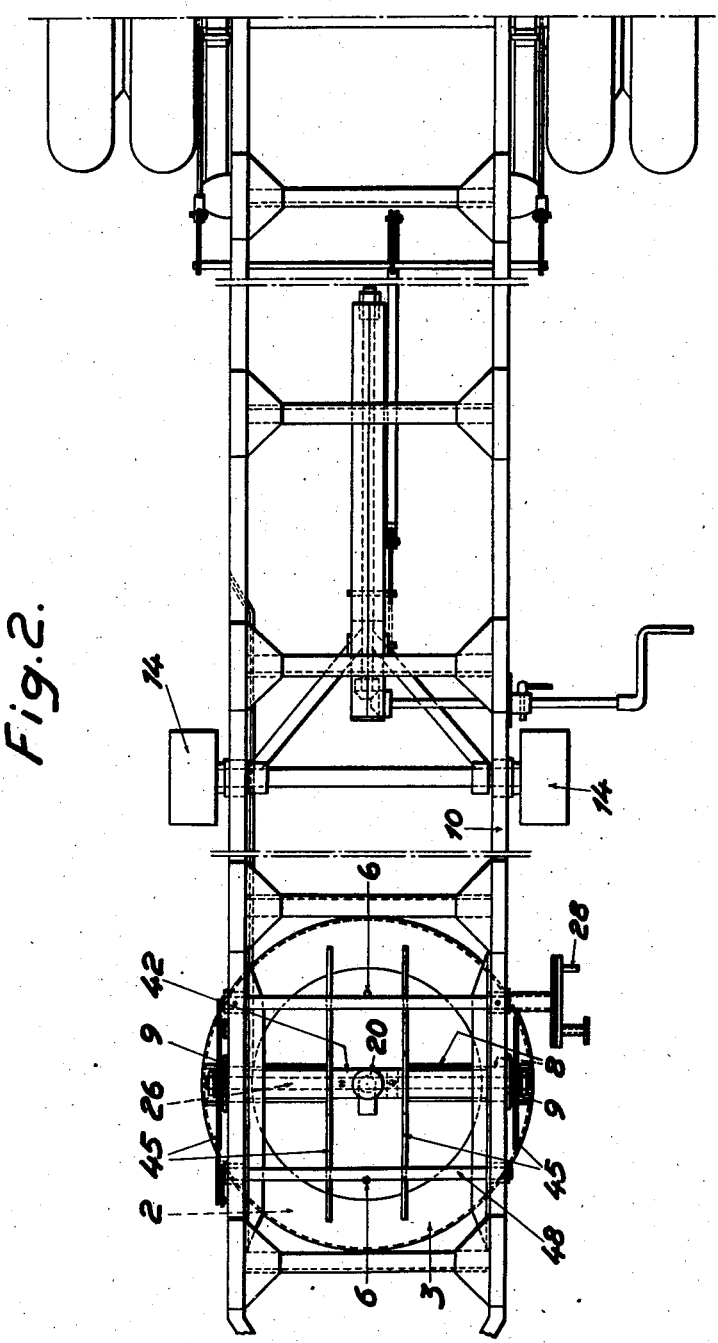
Figure 3:
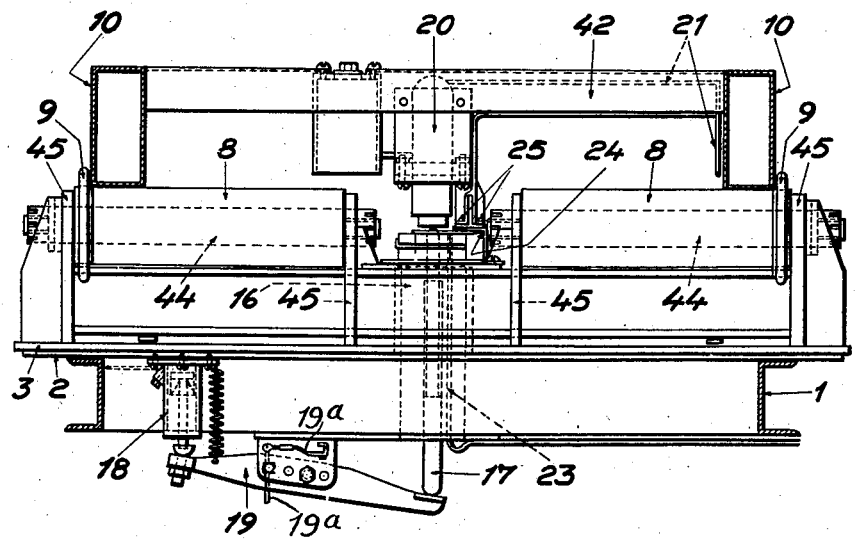
Fig. 3 shows a back view of the traction vehicle and the trailer on a larger scale partly in section, the locking mechanism being however omitted.
Figure 6:
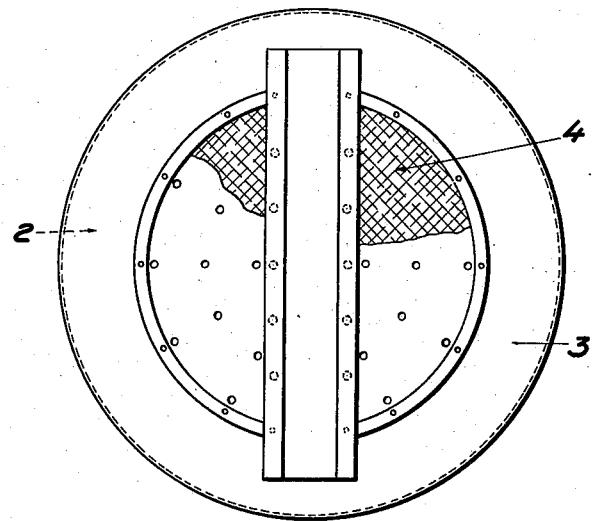
Figs. 6 and 7 show a plane view of the upper turntable disk, with or without protective plate respectively.
Figure 7:
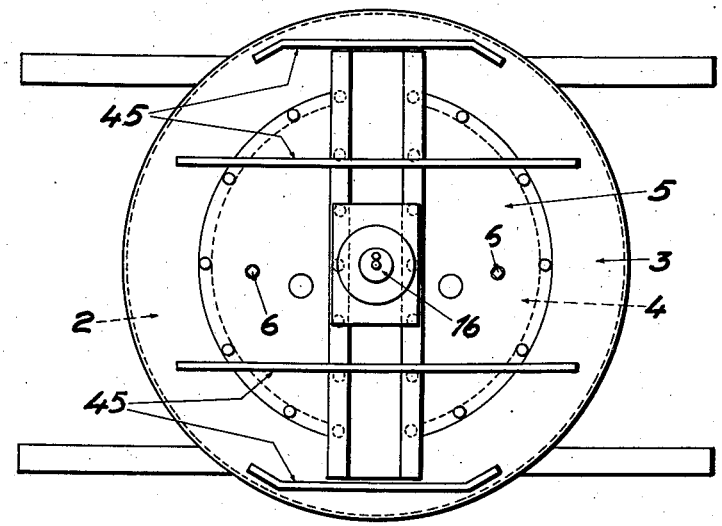

The disks 2 and 3 are located on a sleeve-shaped center bolt 16 surrounded by a bushing and traversed by a rod 17. In the illustrated embodiment there is below the lower stationary disk 2 provided a brake cylinder 18 which is in direct connection with the hydraulic brake system of the traction vehicle. The piston of said cylinder 18 is adapted to actuate a lever 19 which is adjustable to enable variation of the brake effect and which is adapted to cooperate with the rod 17 traversing the center bolt. The rod 17 is in its turn in connection with the piston in a hydraulic brake cylinder 20 located on the frame 10 of the trailer on the lower side of a cross stay 42 which is shown in Figs. 1 to 3 only, said cylinder being through a conduit 21 adapted to actuate the brakes of the trailer. In case the traction vehicle is provided with mechanic brakes the cylinder 18 is replaced by another member suitable to be actuated by the arm 19 or the rod 17. The member or members which are to cooperate with the rod 17 must of course be suited to the brake system of the traction vehicle. Said brake system may be mechanic or hydraulic and work with vacuum or compressed air.

A device, for example a swingable hook 19a, by means of which it is possible to stop the lever 19 actuated by the brake cylinder 18 below the disk 2 when the trailer is to be disconnected, is provided in the illustrated embodiment in order that it shall be possible to brake the traction vehicle also when the trailer has been disconnected. Otherwise the rod 17 would naturally be pressed up and no braking would be exerted on the traction vehicle.

From the source of light of the traction vehicle there is drawn a line 23 to a contact plate 24 against which sliding contacts 25 located on the trailer work. Said contacts are connected with the stop and tail lights of the trailer through lines.

Having now described my invention, what I claim as new and desire to secure by Letters Patent is:

1. A connection between a tractor and a trailer comprising a lower disc secured to the frame of the tractor near the rear end thereof with its upper surface extending in a substantially horizontal plane, an upper disc coaxial with and rotatably supported on said lower disc, two horizontal axles mounted on said upper disc on opposite sides of the latter's axis and having a common axis intersecting the axis of the disc at right angles, two hooks pivoted to the forward end of the trailer and adapted to embrace said axles, respectively, and means to lock said hooks in their operative positions.

2. A connection, as claimed in claim 1, in which said upper disc is provided with a plurality of perforations and a felt disc adapted to be saturated with a lubricant is disposed on said upper disc, a protective plate covering said felt disc and being secured to said upper disc.

3. A connection, as claimed in claim 1, in which said locking means for said hooks includes for each hook a movable stop and an adjustable pawl mounted on said trailer and a single operating member connected to all said stops and pawls whereby they may be operated in unison.

4. A connection, as claimed in claim 1, in which a hollow center bolt traverses said two discs axially, and said trailer comprises a brake control mechanism including an element which is located directly above the upper end of said hollow center bolt when the trailer is connected to the tractor, including means responsive to the operation of a brake mechanism on the tractor to transmit a force axially through said hollow bolt in order to operate said brake mechanism of the trailer.

CARL JOHAN EDWIN RYDH.